Nov. 21, 1961 R. W. DOBBIE 3,009,338
REFRIGERATION APPARATUS
Filed Oct. 1, 1959 2 Sheets-Sheet 2
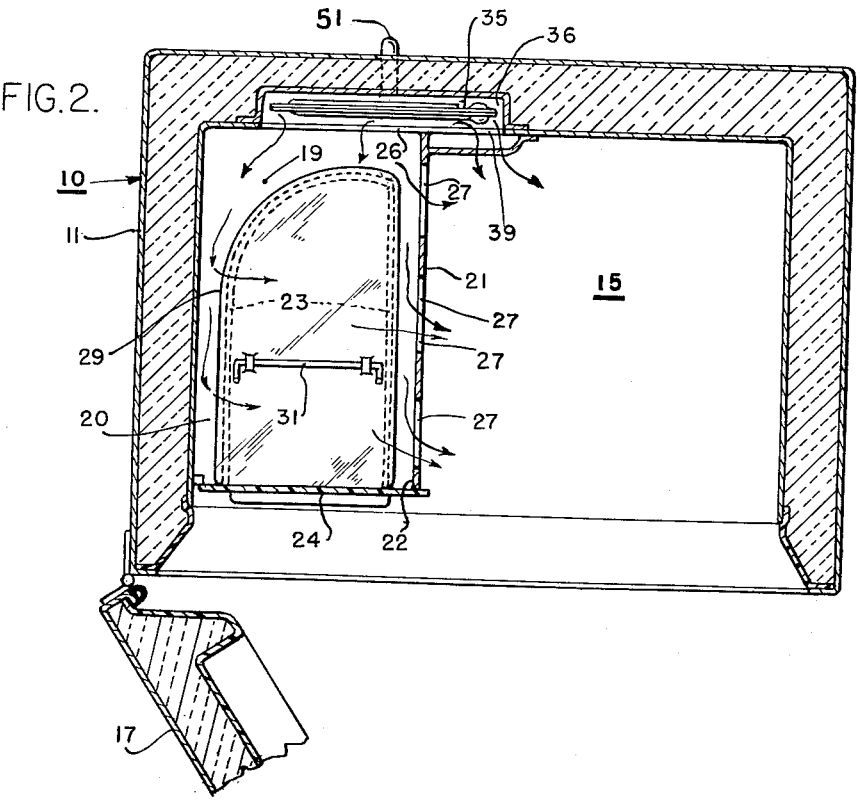
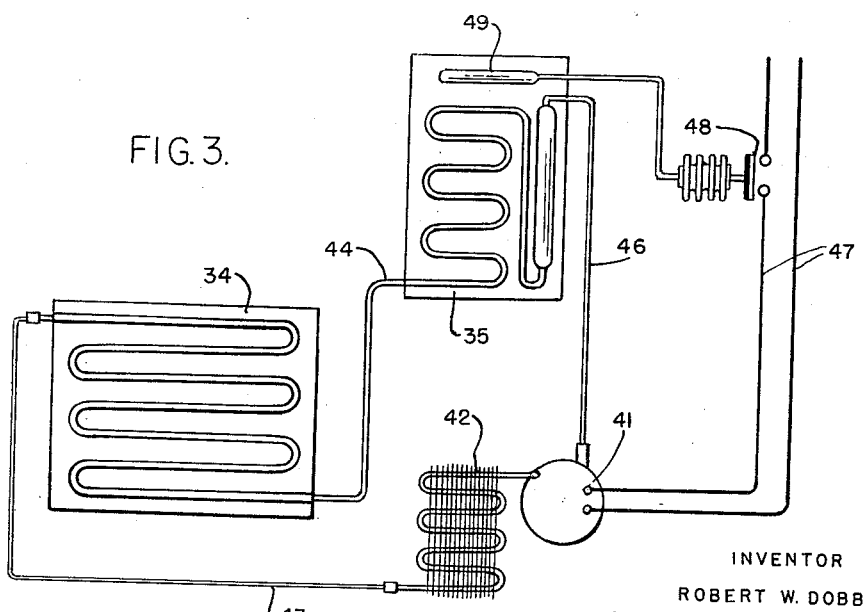
INVENTOR
ROBERT W. DOBBIE
BY *William J. Foley*
ATTORNEY : 3,009,338
REFRIGERATION APPARATUS
Robert W. Dobbie, Columbus, Ohio, assignor to Westinghouse Electric Corporation, East Pittsburgh, Pa., a corporation of Pennsylvania
Filed Oct. 1, 1959, Ser. No. 843,662
4 Claims. (Cl. 62—419)

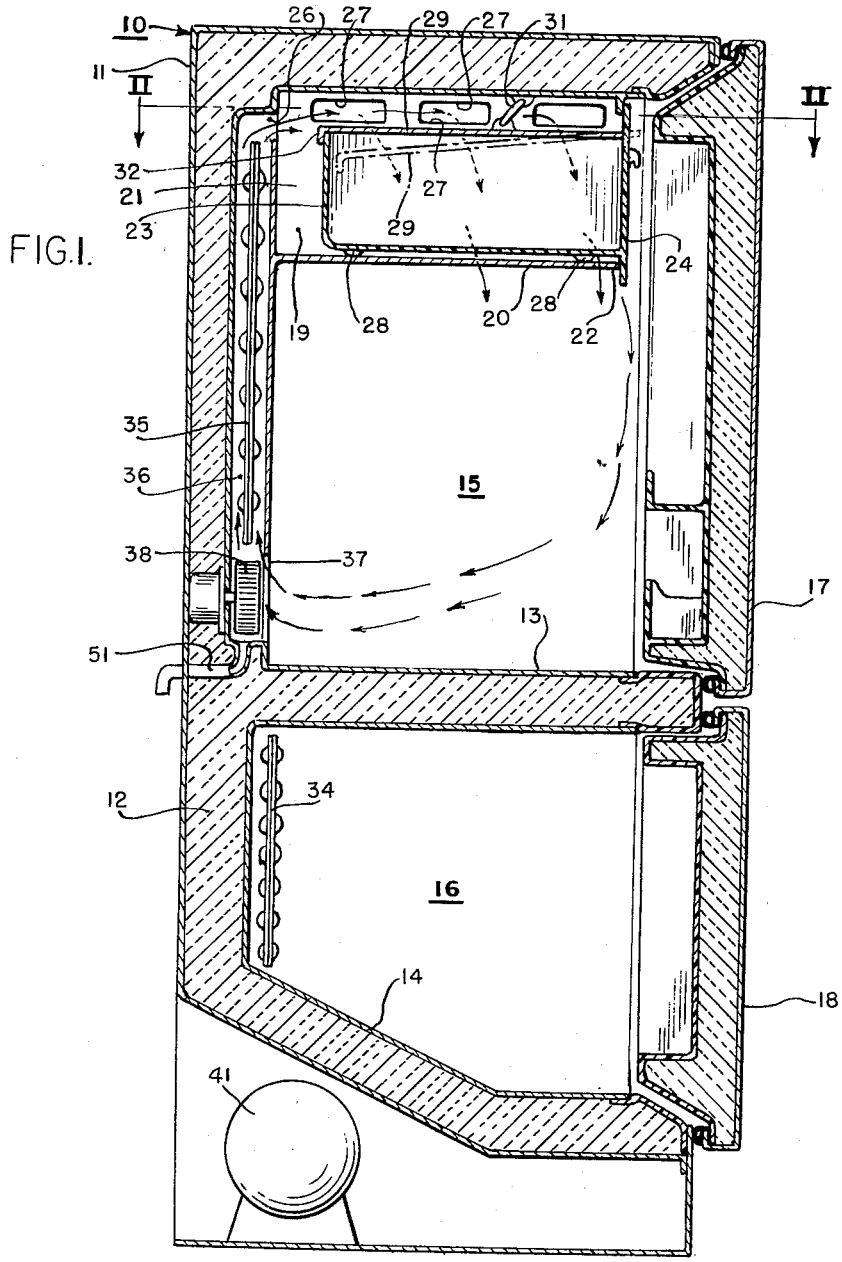

This invention relates to refrigeration apparatus and more particularly to a compartmentalized domestic refrigerator adapted for specialized food storage.

It is common practice to provide in present day domestic refrigerators separate compartments for storage of frozen and unfrozen foods, respectively. The cabinet and the refrigeration system for these refrigerators are designed to maintain in these two compartments the temperature conditions which are best suited for preserving the type of food stored therein. The freezing compartment is generally maintained at a temperature of the order of 0 degrees F. to permit prolonged storage of frozen foods. The unfrozen food storage compartment is generally maintained at a temperature of the order of 38 degrees F.

It has been recognized for some time that neither of these two temperature conditions is ideal for the storage of fresh meats and certain other condiments. Foods of this nature are best preserved at a temperature just above their freezing temperature, which for fresh meats is of the order of 30 degrees F. It is therefore the principal object of this invention to provide in a domestic refrigerator a storage facility which is maintained as closely as is possible to a temperature of 30 degrees F. for the storage and preservation of fresh meats and the like.

This objective is accomplished in a refrigerator structure in which the cooling unit is disposed outside the refrigerated storage space, an arrangement which heretofore has presented a number of problems in achieving satisfactory meat storage temperatures because of the absence of a prime refrigerated surface within the food storage area with which to extract heat from the meat storage facility. A more specific object of the invention, therefore, is the provision of a meat storage compartment within the main unfrozen food storage compartment of a refrigerator in which the main compartment is refrigerated by means of a cooling unit that is disposed outside the main compartment.

In accordance with this invention, optimum temperature and humidity conditions for meat storage are achieved by providing an auxiliary compartment which is partitioned from the main unfrozen food storage compartment and through which is circulated a substantial quantity of air which has been refrigerated to a temperature below 30 degrees F. A covered meat container is removably disposed within this auxilairy compartment in spaced relation to the several walls of the auxiliary compartment so that it is bathed in the chilled air circulating through the auxiliary compartment. Refrigeration, or chilling, of the air is achieved by withdrawing a quantity of air from a lower region of the main unfrozen food storage compartment, forcibly circulating this air over a cooling unit which is operated at an average temperature of below 30 degrees F., and returning the chilled air in part directly to the main compartment and in part through the auxiliary compartment. The quantity of refrigerated air diverted through the auxiliary compartment is sufficient to maintain the contents of the meat storage container at the optimum temperature of 30 degrees F.

Other features of the invention include utilization of the front wall of the meat storage container as a closure for the opening in the auxiliary compartment through which the container is disposed in the compartment. A novel closure arrangement for the top opening in the container is also provided, which insures isolation of the contents of the meat container from the chilled air flowing through the auxiliary compartment, so as to prevent dehydration of the contents of the container.

Other objects, features and advantages of the invention will be explained in the following detailed description of the invention in which reference is made to the accompanying drawings, wherein:

FIG. 1 is a vertical sectional view through a domestic refrigerator embodying this invention;

FIG. 2 is a horizontal sectional view through the refrigerator shown in FIG. 1, taken as indicated by line II—II in FIG. 1; and FIG. 3 is a schematic diagram of a refrigeration system employed in the refrigerator of FIGS. 1 and 2.

Referring particularly to FIG. 1, the refrigerator there illustrated comprises a heat insulated cabinet 10 having an outer shell 11 which is separated by heat insulation 12 from two compartment liners 13 and 14 which form, respectively, an unfrozen food storage compartment 15 and a frozen food storage compartment 16. The unfrozen food storage compartment 15, which is also hereinafter referred to as a main, or first, compartment, is provided with a front access opening which is closed by a hingeably mounted door 17. A separate door 18 is preferably provided for closing the frozen food storage compartment 16.

It is to be understood that the refrigerator cabinet shown in the drawings was chosen for purposes of illustration only. This invention is applicable to refrigerators having compartment arrangements other than that shown, such as, for example, refrigerators in which the frozen food compartment 16 is located above the main compartment 15. In fact, refrigerators embodying this invention may possess but the one, main compartment 15.

In accordance with the invention, the main storage compartment 15 is subdivided to provide an auxiliary, or secondary, storage compartment 19 adapted to store meat and similar foodstuffs at a temperature below the average temperature maintained within the main storage compartment 15. As best shown in FIGS. 1 and 2, the auxiliary compartment 19 is defined by a lower partition wall 20 and a vertical partition wall 21 in cooperation with portions of the top, side and rear walls of compartment liner 13. This partitioning arrangement provides a front opening 22 for compartment 19 through which a meat storage receptacle, or container, 23 is inserted into the compartment. Container 23 is of the open-top variety for ease of access to the contents thereof when it is removed from the compartment 19. The container 23 preferably has its front wall 24 formed of a material having at least some heat insulating qualities, such as plastic material, inasmuch as it also serves as a closure for compartment opening 22 and is exposed to warmer air in the main compartment 15. If desired, some economies in manufacture can be effected by molding the entire container 23 from plastic material.

The container 23 is subjected on all sides except the front thereof to forcibly circulated, chilled air which enters auxiliary compartment 19 through an opening 26 at the rear thereof and which exits the container through slot-like openings 27 provided in an upper region of vertical partition 21. To facilitate the flow of chilled air over the bottom of the container 23, this region of the container preferably has a plurality of feet 28 formed thereon to space the container from the compartment bottom wall partition 20. The side and rear walls of the container 23 are also spaced from adjacent walls of the compartment 19. The container front wall 24, of course, closes the front opening 22 of compartment 19 and insures that the cold air will be sufficiently confined within compartment 19 to flow entirely around the top, bottom and sides of the container.

The top of container 23 is closed by a cover, or lid, 29 pivotally supported from the top wall of compartment liner 13 by means of a hanger 31, which is connected to the cover 29 in a region just forward of the center of gravity of the cover. With container 23 removed from compartment 19, hanger 31 permits cover 29 to drop to a lowered position with its rear end tilted downwardly beneath the plane of the upper edge of container 23, so that the container must lift the cover 29 slightly as it is inserted into compartment 19, thus assuring uniform seating of the cover 29 on the rim of the container. The cover 29 is also preferably provided with a depending rim 32 along its rear and side edges to assist in positioning the cover 29 with respect to the container 23. The purpose of the cover 29 is to seal the container to at least restrict contact between the chilled air flowing through compartment 19 and the contents of container 23 and thereby prevent dehydration of the contents of the container.

Refrigeration of the several storage areas of the cabinet 10 is accomplished by means of a refrigeration system (illustrated in FIG. 3) which includes two cooling units, or evaporators 34 and 35. Referring to FIG. 1, the low temperature cooling unit 34, is disposed in frozen food storage compartment 16 for refrigerating this storage area of the cabinet. Cooling unit 35 is employed to refrigerate air in the main storage compartment 15 and is disposed in a duct, or flue, 36 located just outside the rear wall of compartment liner 13 in the insulated space between the liner and the cabinet shell 11. Air is withdrawn from a lower region of compartment 15 through an opening 37, provided in the rear wall of liner 13, by a motor driven blower 38 which forcibly circulates this air upwardly through duct 36 in heat exchange relationship with cooling unit 35. As will be explained later, the cooling unit 35 is maintained at an average temperature below 30 degrees F. in order to refrigerate, or chill, the air forcibly circulated thereover to a temperature below 30 degrees F.

Air chilled by the cooling unit 35 is forcibly discharged from the duct 36 in part through an opening 39 (see FIG. 2) at the upper end of the duct into an upper region of the main unfrozen food storage compartment 15. A substantial portion of the refrigerated air is, however, in accordance with this invention, discharged through opening 26, which also communicates with the upper end of duct 36, so that refrigerated air is discharged into auxiliary compartment 19 where it flows around and contacts several walls of the meat storage container 23. Air leaves the compartment 19 through openings 27 in partition 21 and enters the main storage compartment 15, through which it circulates to assist in the refrigeration of the contents of that compartment. It can be readily appreciated that directing a substantial quantity of the refrigerated air leaving duct 36 into contact with several walls of the meat storage container 23 has the effect of refrigerating this container to a temperature substantially below the average temperature which is maintained within main storage compartment 15. The container 23 is, therefore, rendered suitable for the storage of foodstuffs, such as meat, which must be maintained at a lower temperature for extended period preservation.

The curvilinear configuration of the outer rear corner of the container 23 (indicated at 30 in FIG. 2) serves two purposes. First, it facilitates removal and replacement of the meat container 23 from compartment 19 by permitting the container to be turned in a horizontal plane to clear portions of cabinet door 17 as the container is removed from and inserted into the auxiliary compartment. Secondly, the curved outer surface of the container assists in directing air discharged from opening 26 to the outer side of the container and thereby further insures that the container is bathed in refrigerated air.

While other types of refrigeration systems may be employed in practising this invention, the preferred system is of the compressor-condenser-expander variety, such as that illustrated in FIG. 3. In this system a vaporizable refrigerant fluid in a vapor state is compressed by a motor-compressor unit 41 and the compressed refrigerant vapor is condensed in a condenser 42 and thereafter fed through an expansion device, such as a capillary restrictor tube 43, to the frozen food cooling unit 34. The refrigerant vaporized in cooling unit 34 absorbs heat from compartment 16. A mixture of liquid and gaseous refrigerant is carried from cooling unit 34 by an unrestricted conduit 44 which is connected to cooling unit 35. The remainder of the refrigerant is vaporized in cooling unit 35 and is returned to the motor-compressor unit 41 through a suction conduit 46. Control of the refrigeration system is effected by intermittently making and breaking an electrical circuit 47 supplying motor-compressor unit 41 with electrical energy. The circuit 47 includes a thermostatic switch 48 which is responsive to the temperature of the food storage compartment cooling unit 35, as sensed by a control bulb 49 disposed in thermal contact with cooling unit 35. Thermostatic control switches of this type are well known in the refrigeration art. The main characterizing feature of the control switch here used is that it is adapted to energize the motor-compressor unit 41 to operate cooling units 34 and 35, i.e., circulate refrigerant therethrough, when the control bulb 49 senses a temperature value at the cooling unit 35 of the order of 34 to 36 degrees F., and to deenergize the motor-compressor unit upon sensing a temperature substantially below 32 degrees F., preferably in the range of 0 to —10 degrees F. By maintaining a wide differential between the cut-in and cut-out temperature values for the thermostatic switch 48—values which, it is to be noted, are respectively slightly above and substantially below the freezing point of water—it is possible to maintain an average temperature of the cooling unit 35 which is substantially below 30 degrees F. Thus, a relatively low rate of air circulation over the cooling unit 35 is sufficient to overcome the influx of heat through the insulated cabinet walls and maintain a temperature of approximately 38 degrees F. in the main food storage compartment 15. More than a proportionate volume of the chilled air is circulated through auxiliary compartment 19 and around container 23 and the container is thereby maintained at a temperature lower than the temperature in the main compartment 15.

By allowing the cooling unit 35 to warm to above 32 degrees F. during its non-operating periods, ice and frost are permitted to melt therefrom. Condensate dropping from cooling unit 35 as a result of this automatic defrosting operation is preferably discharged from the food storage compartment 15 by suitable means, such as a drain pipe 51 communicating with the lower end of air duct 36 (see FIG. 1).

From the foregoing it will be apparent that this invention provides improved facilities for the storage of food items which require low temperature, non-freezing conditions for extended preservation.

While the invention has been shown in but one form, it will be obvious to those skilled in the art that it is not so limited, but is susceptible of various changes and modifications, without departing from the spirit thereof.

What is claimed is:

1. In a refrigerator, a heat insulated cabinet having a first compartment for the storage of unfrozen foods, a door providing access to the front of said compartment, partition means defining a front opening auxiliary compartment in said first compartment, a cooling unit for cooling air in said first compartment, means for intermittently operating said cooling unit between temperature limits which are above and below 32° F., respectively, to maintain an average temperature thereof of below 30° F., means for forcibly circulating air from said first compartment over said cooling unit and back to said first compartment, at least a portion of the air being returned to said first compartment being directed through said auxiliary compartment, an open top container for storing foods at a temperature below the average temperature maintained in said first compartment, said container being removably disposed in said auxiliary compartment in spaced relationship to the top and side walls of said auxiliary compartment whereby several walls of said container are contacted by refrigerated air passing through the auxiliary compartment, said container having a front wall forming a closure for the front opening of said auxiliary compartment, and means for closing the top of said container to restrict contact between the air flowing through said auxiliary compartment and the contents of said container.

2. In a refrigerator, a heat insulated cabinet having a first compartment for the storage of unfrozen foods, a door for said cabinet providing access to the front of said compartment, partition means defining a front opening auxiliary compartment in an upper region of said first compartment, a cooling unit for cooling air in said first compartment, means for forcibly withdrawing air from a lower region of said first compartment, conveying said air over said cooling unit and discharging chilled air in part directly into an upper region of said first compartment and in part through said auxiliary compartment and then into said first compartment, means for operating said cooling unit to maintain an average temperature of said chilled air of below 30° F., and a closed container for storing foods at a temperature below the average temperature maintained in said first compartment, said container being removably disposed in said auxiliary compartment in spaced relationship to at least the top and side walls of said auxiliary compartment whereby chilled air flowing through said auxiliary compartment contacts several sides of said container, said container having a front wall thereof forming a closure for said front opening of said auxiliary compartment.

3. In a refrigerator, a heat insulated cabinet having a first compartment for the storage of unfrozen foods, a door for said cabinet providing access to the front of said compartment, partition means defining a front opening auxiliary compartment in an upper region of said first compartment, a cooling unit for cooling air in said first compartment, means for forcibly withdrawing air from a lower region of said first compartment, conveying said air over said cooling unit and discharging chilled air in part directly into an upper region of said first compartment and in part through said auxiliary compartment and then into said first compartment, means for operating said cooling unit to maintain an average temperature of said chilled air of below 30° F., a top opening container for storing foods at a temperature below the average temperature maintained in said first compartment, said container being disposed in said auxiliary compartment in spaced relationship to at least the top and side walls of said auxiliary compartment whereby chilled air flowing through said auxiliary compartment contacts several sides of said container, said container having a front wall thereof forming a closure for said front opening of said auxiliary compartment, and a cover suspended in said auxiliary compartment for closing the top of said container.

4. In a refrigerator, a heat insulated cabinet having a main compartment for the storage of unfrozen foods, a door for said cabinet providing access to the front of said compartment, partition means defining a front opening auxiliary compartment in an upper region of said main compartment, a cooling unit for cooling air in said main compartment, means for forcibly withdrawing air from a lower region of said main compartment, conveying said air over said cooling unit and discharging chilled air in part directly into an upper region of said main compartment and in part through said auxiliary compartment into said main compartment, means for operating said cooling unit to maintain an average temperature of said chilled air of substantially below 30° F. to maintain an average temperature of the order of 38° F. in said main compartment, and a closed container for storing foods at a temperature below the average temperature maintained in said main compartment, said container being disposed in said auxiliary compartment in spaced relationship to at least the top and side walls of said auxiliary compartment whereby chilled air flowing through said auxiliary compartment contacts several sides of said container, said container having a front wall thereof forming a closure for said front opening of said auxiliary compartment, there being a sufficient quantity of said chilled air circulated through said auxiliary compartment to maintain said container and its contents at a temperature of the order of 30° F.

References Cited in the file of this patent
UNITED STATES PATENTS

| 1,979,638 | Philipp | Nov. 6, 1934 |
| 2,219,833 | Atchison | Oct. 29, 1940 |
| 2,900,806 | Wurtz | Aug. 25, 1959 |
| 2,937,511 | Mann | May 24, 1960 |